(12) United States Patent
Kiyosawa et al.

(10) Patent No.: US 7,249,536 B2
(45) Date of Patent: Jul. 31, 2007

(54) WAVE GEAR DEVICE

(75) Inventors: Yoshihide Kiyosawa, Nagano-ken (JP); Noboru Takizawa, Nagano-ken (JP)

(73) Assignee: Harmonic Drive Systems Inc., Tokyo (JP)

( * ) Notice: Subject to any disclaimer, the term of this patent is extended or adjusted under 35 U.S.C. 154(b) by 214 days.

(21) Appl. No.: 11/161,423

(22) Filed: Aug. 2, 2005

(65) Prior Publication Data

US 2006/0037430 A1   Feb. 23, 2006

(30) Foreign Application Priority Data

Aug. 18, 2004   (JP) .............................. 2004-238617

(51) Int. Cl.
*F16H 33/00* (2006.01)

(52) U.S. Cl. ............................................. 74/640

(58) Field of Classification Search ................ 74/640; 475/162, 904
See application file for complete search history.

(56) References Cited

U.S. PATENT DOCUMENTS 5,269,202 A * 12/1993 Kiyosawa et al. ............ 74/640
5,715,732 A * 2/1998 Takizawa et al. ............ 74/640
6,050,155 A * 4/2000 Tortora ........................ 74/640
6,202,508 B1 * 3/2001 Takizawa ..................... 74/640

FOREIGN PATENT DOCUMENTS

| JP | 6-017888 | | 1/1994 |
| JP | 410159917 A | * | 6/1998 |

* cited by examiner

*Primary Examiner*—Roger Pang
(74) *Attorney, Agent, or Firm*—Buchanan Ingersoll & Rooney PC

(57) ABSTRACT

A diaphragm of a cup-shaped flexible external gear of a cup-shaped wave gear device having a high reduction ratio of 100 or higher is given a thickness t in a position of a radius r of the diaphragm whereby the thickness t is a value that satisfies the expression $A/r^2$ when A is a constant. The constant A is preferably a value that satisfies the expression $0.0014\,D^3 < A < 0.0026\,D^3$, where D is a pitch diameter of the flexible external gear, and the range of the radius r whereby the thickness t is defined as described above in the diaphragm is preferably set to satisfy the expression $0.6\,d < r < 0.4\,D$, where d is a diameter of a discoid rigid boss made continuous with an internal peripheral end of the diaphragm. Stress concentration can be alleviated, and it is possible for the allowable transmission torque to be increased compared to the prior art.

4 Claims, 5 Drawing Sheets

WAVE GEAR DEVICE

BACKGROUND OF THE INVENTION

1. Field of the Invention

The present invention relates to a cup-shaped wave gear device having a high reduction ratio of 100 or higher, for example, and particularly relates to a wave gear device in which a diaphragm of a cup-shaped flexible external gear has a cross-sectional shape that is adapted for alleviating stress concentration.

2. Description of the Related Art

Known wave gear devices include a cup-shaped wave gear devices in which a flexible external gear thereof is cup-shaped. FIG. 1 is a longitudinal sectional view showing a typical cup-shaped wave gear device, and FIG. 2 is a block diagram showing the structure thereof in cross section in a plane perpendicular to a central axis of the device. As shown in these drawings, a cup-shaped wave gear device 1 is provided with an annular rigid internal gear 2, a cup-shaped flexible external gear 3 disposed in concentric fashion inside the internal gear, and an elliptically profiled wave generator 4 fitted inside the external gear. The flexible external gear 3 is provided with a flexible cylindrical body 11, an annular diaphragm 12 extending towards inside in a radial direction from one end in a central axis direction of the cylindrical body, a discoid rigid boss 13 made continuous with an internal peripheral edge of the diaphragm 12, and external teeth 14 formed in an external peripheral surface portion of the other end of the cylindrical body 11.

The portion of the cylindrical body 11 where the external teeth 14 are formed in the flexible external gear 3 thus shaped is flexed in an elliptical shape by the wave generator 4, and the external teeth positioned at both ends in a major axis direction of this ellipse mesh with internal teeth 15 of the rigid internal gear 2. Since the numbers of teeth in the gears 2 and 3 differ by 2n (n is a positive integer), meshing positions of the gears 2 and 3 move in a circumferential direction when the wave generator 4 is rotated by a motor or other rotational driving source, and relative rotation occurs in the gears 2 and 3 according to the difference in the number of gear teeth. The rigid internal gear 2 is generally fixed, and rotation having a considerably reduced speed is outputted from the flexible external gear 3.

The cylindrical body 11 of the cup-shaped flexible external gear 3 flexed in the elliptical shape by the wave generator 4 has a cylindrical shape in a state prior to being deformed, as shown in FIG. 3(a). After flexure into the elliptical shape by the wave generator 4, the cross-section that includes a major axis thereof reaches a state in which the cylindrical body 11 gradually widens outward in the direction from the side of the diaphragm 12 toward an open end 11a, as shown in FIG. 3(b). As shown in FIG. 3(c), the cross-section that includes a minor axis of the ellipse reaches a state in which the cylindrical body 11 gradually narrows in the direction from the side of the diaphragm 12 toward the open end 11a.

The diaphragm 12 is formed between the cylindrical body 11 and the rigid boss 13 in order to flex the portion of the cylindrical body 11 on the side of the open end 11a into the elliptical shape. Specifically, when the open end 11a of the cylindrical body 11 is flexed in the elliptical shape, the diaphragm 12 bends back as indicated by the arrow in FIG. 3(b) about a base portion connected to the boss 13 in the cross-section that includes the major axis of the ellipse. In contrast, in the cross-section that includes the minor axis, the diaphragm 12 tilts toward the open end 11a as indicated by the arrow in FIG. 3(c). Therefore, while the diaphragm 12 is subjected to this type of flexural stress towards a central axis 11b, it is also subjected to shear stress due to torque transmission.

Therefore, with the diaphragm 12 under this combination of stresses, the cross-sectional shape thereof is designed so that only a small force is required to deform the part of the cylindrical body 11 on the side of the open end in an elliptical shape, and a large torque can be transmitted. In particular, the cross-sectional shape of the diaphragm is designed so that stress is not concentrated on the diaphragm when it is under this combination of stresses. A cup-shaped flexible external gear whereby stress concentration can be alleviated is disclosed in JP-A 6-17888, for example.

The amount of deformation of the diaphragm 12 towards the central axis 11b varies according to the reduction ratio of the wave gear device 1. In the case of a low reduction ratio, since there is a large amount of elliptical deformation in the cylindrical body 11 on the side of the open end, the amount of deformation of the diaphragm 12 in the direction of the central axis 11b increases by a commensurate amount. In contrast, the amount of deformation decreases when the reduction ratio is high. The optimum cross-sectional shape of the diaphragm 12 thus differs according to the reduction ratio. However, in the prior art, the cross-sectional shape of the diaphragm 12 is not determined with consideration for the reduction ratio, and the optimum cross-sectional shape of the diaphragm is determined based on the large amount of deformation of the diaphragm 12 in the central axis direction at a low reduction ratio.

Specifically, flexural stress occurring in conjunction with the elliptical deformation of the cylindrical body, shear stress caused by transmission torque, and flexural stress caused by assembly error basically act on the diaphragm of the flexible external gear of the wave gear device. However, in the case of the wave gear device having a high reduction ratio of 100 or higher, since the amount of elliptical deformation is small, the flexural stress caused thereby is also small, and the shear stress caused by transmission torque takes precedence.

In the conventional method for setting the cross-sectional shape of the diaphragm, the large flexural stress in the case of a low reduction ratio is assumed. As a result, a maximum allowable transmission torque is limited since an excessive allowable flexural stress is employed and an allowable shear stress is kept low when the cross-sectional shape of the diaphragm of the wave gear device with the high reduction ratio is set.

SUMMARY OF THE INVENTION

In view of these drawbacks, a main object of the present invention is to provide a cup-shaped flexible external gear provided with a diaphragm whose cross-sectional shape is adapted for use in a wave gear device having a high reduction ratio.

It was recognized in the present invention that flexural stress acting on a diaphragm of a flexible external gear caused by elliptical deformation is extremely small compared to shear stress occurring due to torque transmission in a cup-shaped wave gear device having a high reduction ratio of 100 or higher, and a cross-sectional shape for the diaphragm was discovered that is suited for alleviating stress concentration primarily caused by shear stress and increasing a maximum allowable transmission torque.

According to the present invention, there is provided a wave gear device comprising an annular rigid internal gear; a cup-shaped flexible external gear provided with a cylindrical body having flexibility in a radial direction, an annular diaphragm extending towards inside in a radial direction from one end in the central axis direction of the cylindrical body, a discoid rigid boss integrally formed in a center portion of the diaphragm, and external teeth formed in an external peripheral surface portion of the other end in the central axis direction of the cylindrical body; and a wave generator for elliptically flexing portions where the external teeth of the external gear are formed to mesh partially with the rigid internal gear, and causing the meshing positions of both gears to move in a circumferential direction; wherein a thickness t is a value that satisfies the following conditional expression (1) when t is the thickness of the diaphragm in a position of a radius r about the central axis thereof, and A is a constant:

$$t=A/r^2 \qquad (1)$$

In this arrangement, the constant A is preferably a value that satisfies the following conditional expression when D is a pitch diameter of the flexible external gear:

$$0.0014D^3 < A < 0.0026D^3 \qquad (2)$$

The range of the thickness t defined by the conditional expression (1) in the diaphragm is preferably the range of the value of the radius r that satisfies the following conditional expression when d is the outer diameter of the boss:

$$0.6d < r < 0.4D \qquad (3)$$

Furthermore, when the shape of the profile on the side of the cylindrical body is defined by a straight line in cross section in a plane that includes the central axis in the connecting portion between the boss and the diaphragm, the profile shape on the other side can be defined by a curve having a curvature radius R that satisfies the following conditional expression:

$$0.02D < R < 0.07D \qquad (4)$$

The diaphragm of the cup-shaped flexible external gear of the wave gear device of the present invention is set to a cross-sectional shape wherein stress concentration due to shear stress can be alleviated in the case of a high reduction ratio of 100 or higher. Therefore, a wave gear device having a high reduction ratio can be obtained that has a high allowable transmission torque compared to the prior art.

DESCRIPTION OF THE PREFERRED EMBODIMENTS

An example of a cup-shaped flexible external gear of a cup-shaped wave gear device according to the present invention will be described with reference to the drawings.

Figure 1:
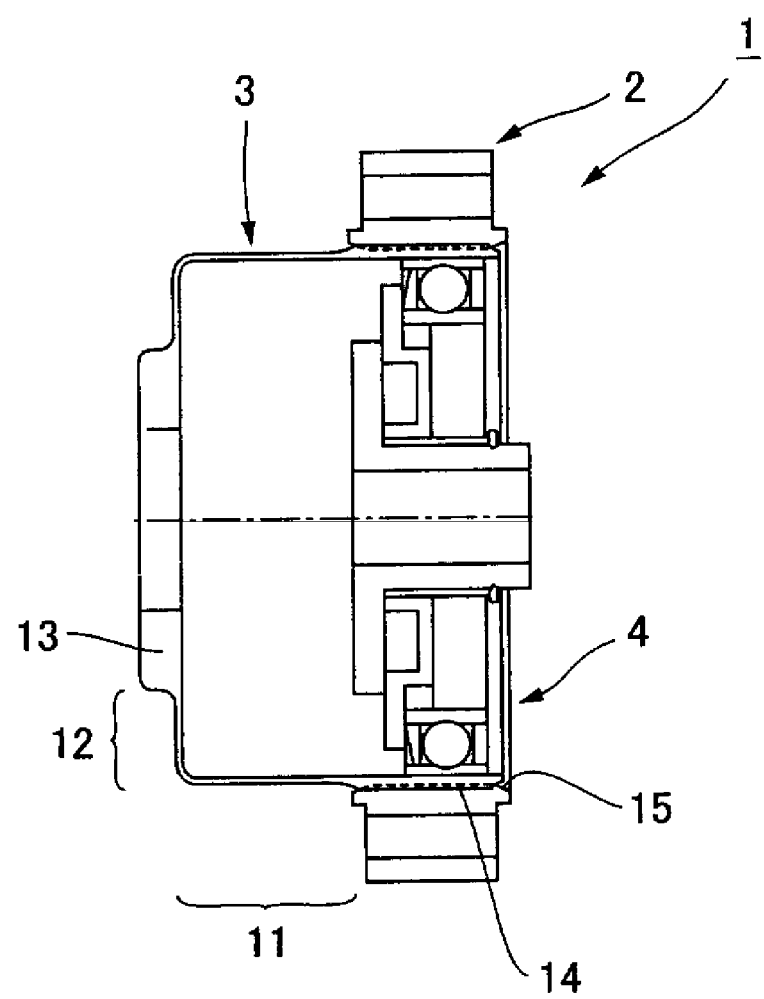
FIG. 1 is a longitudinal sectional view of a common cup-shaped wave gear device.
Figure 2:
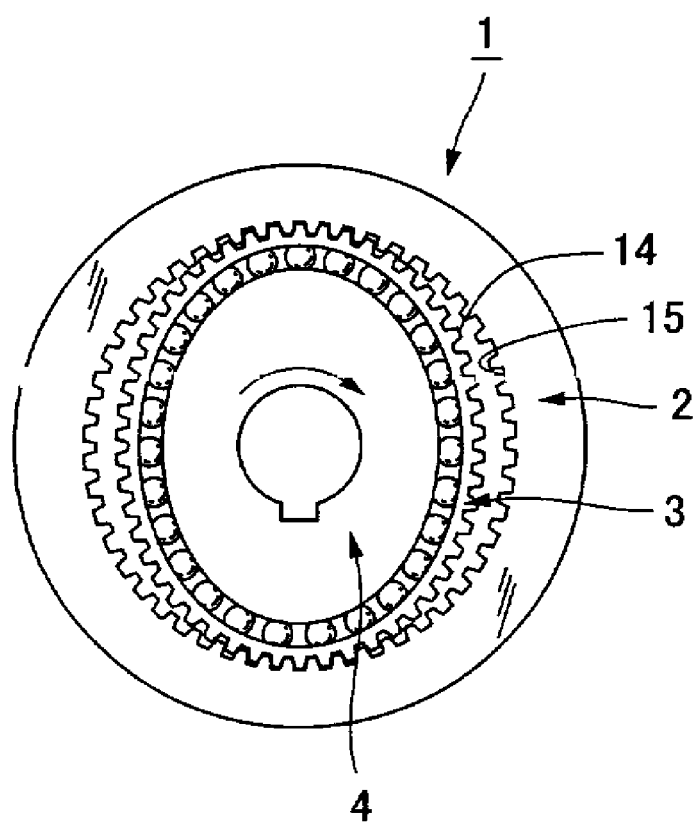
FIG. 2 is a schematic block diagram in cross section in a plane perpendicular to an axis line of the wave gear device in FIG. 1.
Figure 3:
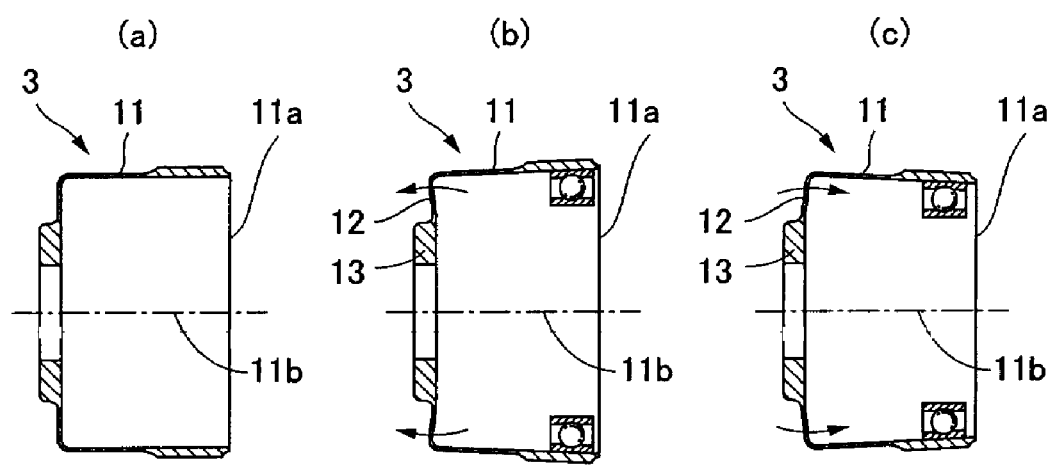
FIG. 3 is a diagram depicting a deformed state of the cup-shaped flexible external gear.
Figure 4:
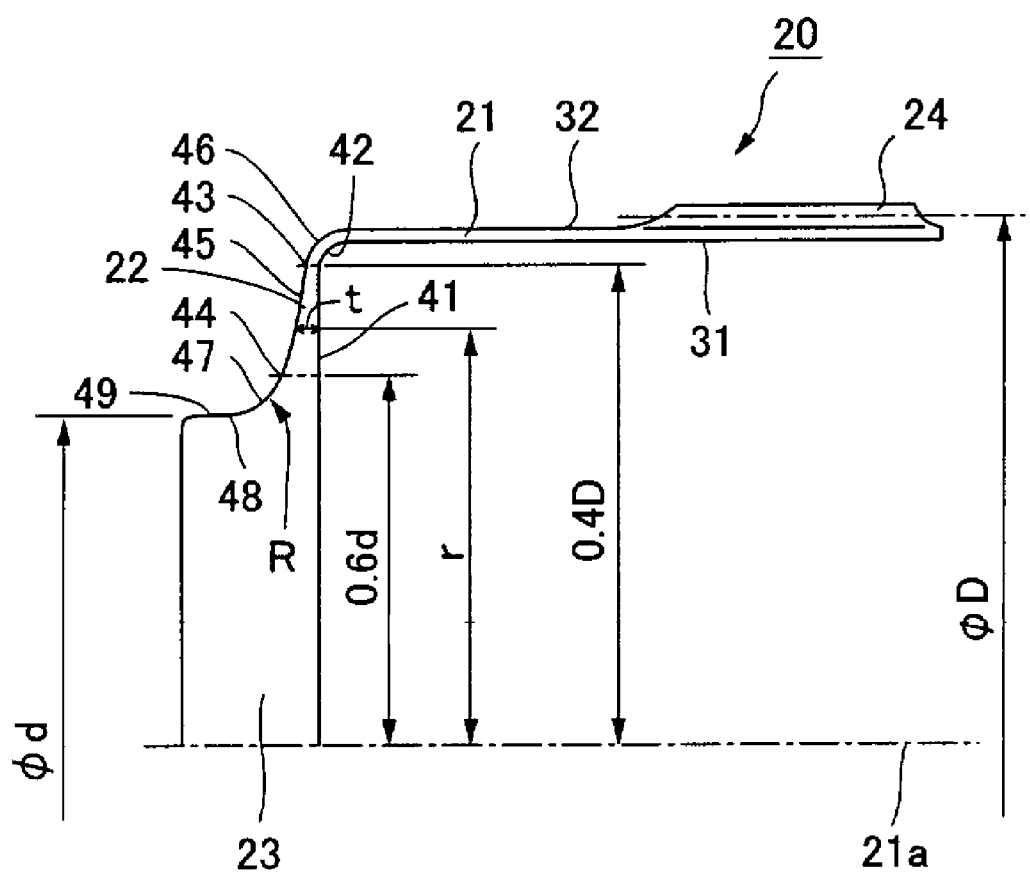
FIG. 4 is a longitudinal sectional view of the cup-shaped flexible external gear according to the present invention.

FIG. 4 is a longitudinal sectional view showing the cup-shaped flexible external gear of the present example. A flexible external gear 20 of the present example has the same basic shape as that of the prior art (see FIGS. 1 and 2), and is provided with a cylindrical body 21 that can be flexed in a radial direction, an annular diaphragm 22 extending towards inside in a radial direction from one end in the direction of a central axis 21a of the cylindrical body, a discoid rigid boss 23 integrally formed in concentric fashion in a center portion of the diaphragm 22, and external teeth 24 formed in an external peripheral surface portion of the other end of the cylindrical body 21.

Here, a thickness t is a value that satisfies the following conditional expression (1):

$$t=A/r^2 \qquad (1)$$

where t is the thickness of the diaphragm 22 in a position of the radius r, and A is a constant.

Specifically, in the position of the radius r in the diaphragm 22, shear stress that occurs due to transmission torque T is proportional to $T/(t \cdot r2)$, where t is a wall thickness of the diaphragm in the stress position. Therefore, the wall thickness t needed in order to make the shear stress occurring in each region of the diaphragm constant is proportional to $1/r2$. When the thickness t is set so as to satisfy expression (1) above, an equal shear stress occurs in each region of the diaphragm.

The inventors confirmed that when the cross-sectional shape of the diaphragm of the flexible external gear in the wave gear device having a high reduction ratio of 100 or higher is set as described above without regard for the stress caused by assembly error and flexural stress caused by elliptical deformation of the flexible external gear, there is virtually no concentration of stress, and a diaphragm suited for practical use is obtained.

Constant A is preferably a value that satisfies the following conditional expression:

$$0.0014D^3 < A < 0.0026D^3 \qquad (2)$$

where D is a pitch diameter of the flexible external gear 20.

Since the amount of elliptical deformation increases the smaller the reduction ratio is, a configuration must be adopted wherein the diaphragm is thin overall, concentration of flexural stress is alleviated, and bearing reaction force of the wave generator is low. Conversely, since the amount of elliptical deformation decreases the larger the reduction ratio is, even when the diaphragm is made thick overall, concentration of flexural stress does not occur, and the bearing reaction force of the wave generator does not become excessive. Thus, a value on the minimum side in the above-mentioned conditional expression (2) may be employed when the reduction ratio is small, and a value on the maximum side thereof may be employed when the reduction ratio is large. For example, a value of 0.002 can be employed as the value of A when the reduction ratio is 200.

An internal peripheral end portion and an external peripheral end portion of the diaphragm 22 must be made smoothly continuous with the boss 23 and cylindrical body 21 so that stress concentration does not occur. Consequently, the range of the thickness t defined by conditional expression (1) in the diaphragm 22 is preferably set to exclude this type of transitional portion. Specifically, the range of the value of the radius r preferably satisfies the following conditional expression:

$$0.6d < r < 0.4D \qquad (3)$$

where d is the diameter of the boss 23.

In the present example, when viewed in cross section in a plane that includes the central axis 21a, the cylindrical body 21 is defined by straight lines 31 and 32 extending substantially parallel, except for the portion in which the external teeth 24 are formed, and has substantially the same thickness. An inside profile shape of the diaphragm 22 is defined by a straight line 41 substantially perpendicular to the central axis 21a, a convex curve 42 is made smoothly continuous with the straight line 41, and the other end of this convex curve 42 is made smoothly continuous with the straight line 31 that defines an inside profile of the cylindrical body 21.

An outside profile of the diaphragm 22 is defined by a curve 45 whereby the range (the range from a point 43 to a point 44) defined by the conditional expression (3) satisfies the thickness t determined by the conditional expressions (1) and (2). The endpoint 43 of the curve 45 is also made smoothly continuous with a convex curve 46, and the other end of the convex curve 46 is made smoothly continuous with the straight line 32 that defines the outside profile of the cylindrical body 21.

A concave curve 47 is made smoothly continuous with the inside end 44 of the curve 45 that defines the outside profile of the diaphragm 22, and the other end 48 of the concave curve 47 is made smoothly continuous with a straight line 49 extending substantially parallel to the central axis 21a that defines the external peripheral surface of the boss 23.

A curvature radius R of the concave curve 47 defining the connecting portion between the boss 23 and the diaphragm 22 is preferably set to a value that satisfies the following conditional expression when alleviation of stress concentration and aspects of manufacturing are considered:

$$0.02D < R < 0.07D \tag{4}$$

It was confirmed that stress concentration in the diaphragm 22 can be alleviated and the allowable transmission torque can be increased compared to the prior art in the wave gear device having the high reduction ratio of 100 or higher that uses the cup-shaped flexible external gear 20 whose cross-sectional shape is determined as described above.

Figure 5:
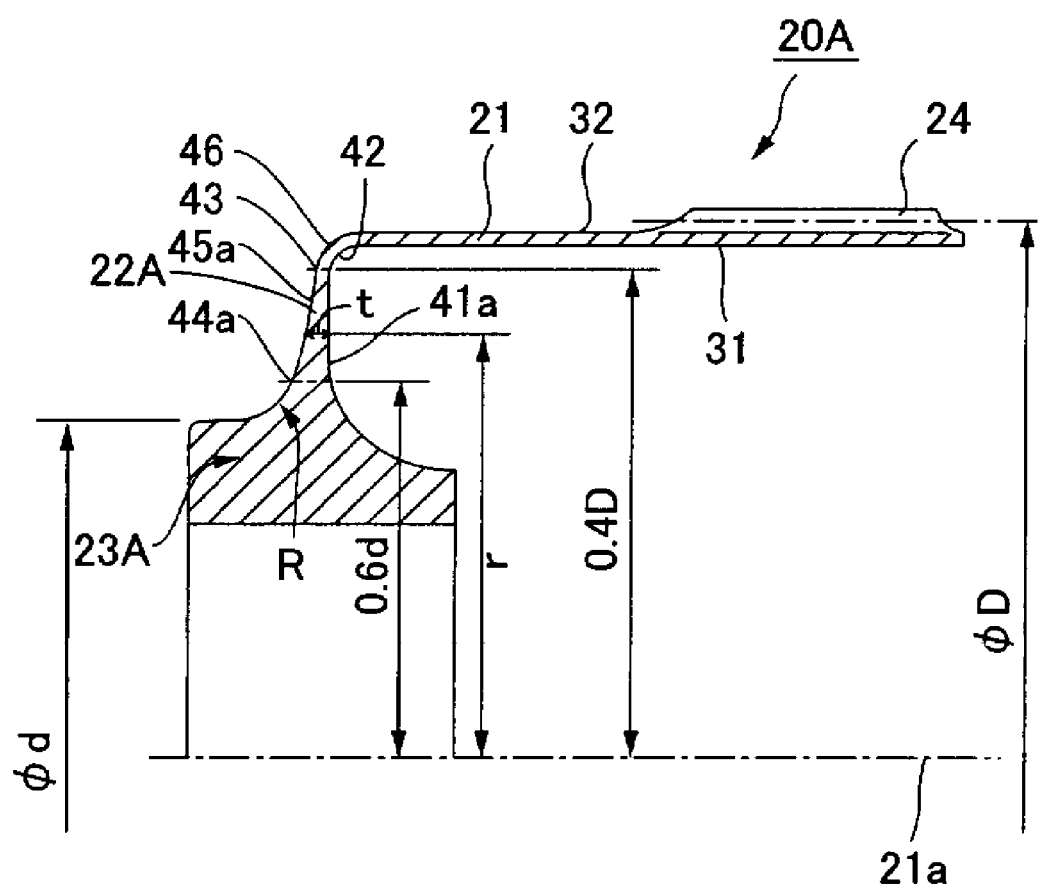
FIG. 5 is a longitudinal sectional view showing another example of a cup-shaped flexible external gear according to the present invention.

In the present example, the inside surface of the diaphragm 22 is defined by the plane (straight line 41) perpendicular to the central axis 21a. The inside surface can also be defined by a curved surface. For example, a flexible external gear 20A shown in FIG. 5 may have a hollow boss 23A, and a cross-sectional shape of the diaphragm 22A may be configured such that an inside thereof is defined by a curved line 41a. Even in this case, an outside curve 45a may be defined such that a thickness t satisfies conditional expression (1).

What is claimed is:

1. A wave gear device comprising:
   an annular rigid internal gear;
   a cup-shaped external gear provided with a cylindrical body having flexibility in a radial direction, an annular diaphragm extending towards inside in the radial direction from one end in a central axis direction of the cylindrical body, a discoid rigid boss integrally formed in a center portion of the diaphragm, and external teeth formed on an external peripheral surface portion of the other end in the central axis direction of the cylindrical body; and
   a wave generator for elliptically flexing a portion of the cylindrical body where the external teeth of the external gear are formed to mesh partially with the rigid internal gear, and causing the meshing positions of both gears to move in a circumferential direction;
   wherein
   a thickness t is a value that satisfies the following conditional expression (1) when t is the thickness of the diaphragm in a position of a radius r about the central axis thereof, and A is a constant:

$$t = A/r^2 \tag{1}.$$

2. The wave gear device according to claim 1, wherein the constant A is a value that satisfies the following conditional expression when D is a pitch diameter of the flexible external gear:

$$0.0014D^3 < A < 0.0026D^3.$$

3. The wave gear device according to claim 2, wherein the range of the thickness t defined by the conditional expression (1) in the diaphragm is the range of the value of the radius r that satisfies the following conditional expression when d is the outer diameter of the boss:

$$0.6d < r < 0.4D.$$

4. The wave gear device according to claim 3, wherein a connecting portion between the boss and the diaphragm has a cross section when cut along a plane including the central axis, the cross section being defined by a straight line on the side of the cylindrical body and a curve on the other side, and the curve having a curvature radius R that satisfies the following conditional expression:

$$02D < R < 0.07D.$$

* * * * *